United States Patent [19]

Nakane et al.

[11] Patent Number: 5,189,140
[45] Date of Patent: Feb. 23, 1993

[54] HEAT-RESISTANT INJECTION-MOLDABLE COPOLYESTER RESINS AND RESIN BLENDS OF THE SAME

[75] Inventors: Toshio Nakane; Hiroaki Konuma; Toshio Shiwaku; Kenji Hijikata, all of Shizuoka, Japan

[73] Assignee: Polyplastics Co., Ltd., Osaka, Japan

[21] Appl. No.: 880,443

[22] Filed: May 8, 1992

[30] Foreign Application Priority Data

May 10, 1991 [JP] Japan .................. 3-105679
Mar. 30, 1992 [JP] Japan .................... 4-73915

[51] Int. Cl.$^5$ ............................................. C08G 63/13
[52] U.S. Cl. ................................. 528/272; 528/298; 528/301; 528/302; 528/307; 528/308
[58] Field of Search ............... 528/272, 298, 301, 302, 528/307, 308

[56] References Cited

U.S. PATENT DOCUMENTS

| | | | |
|---|---|---|---|
| 4,742,151 | 5/1988 | Tate et al. | 528/272 |
| 4,914,179 | 4/1990 | Morris et al. | 528/272 |
| 4,956,448 | 9/1990 | Morris et al. | 528/272 |
| 4,959,450 | 9/1990 | Morris et al. | 528/272 |
| 5,006,613 | 4/1991 | Shephered et al. | 525/444 |
| 5,011,877 | 4/1991 | Morris et al. | 524/115 |
| 5,011,878 | 4/1991 | Morris et al. | 524/115 |
| 5,037,946 | 8/1991 | Morris et al. | 528/272 |
| 5,057,595 | 10/1991 | Morris et al. | 528/272 |
| 5,081,220 | 1/1992 | Morris et al. | 528/272 |
| 5,102,705 | 4/1992 | Yammoto et al. | 428/36.92 |

Primary Examiner—John Kight, III
Assistant Examiner—S. A. Acquah
Attorney, Agent, or Firm—Nixon & Vanderhye

[57] ABSTRACT

A heat-resistant moldable copolyester resin is the copolymerization reaction product of a diol monomer component comprised mainly of 1,4-cyclohexanedimethanol, and an acid monomer component which includes first and second carboxylic acid comonomers. The first acid comonomer is a napthalenedicarboxylic acid or an ester-forming derivative thereof, while the second acid comonomer is 4,4'-diphenyldicarboxylic acid or an ester-forming derivative thereof. The first and second comonomers are present in amounts which satisfy the molar fraction ratio:

$$3/7 \leq A/B \leq 8.5/1.5$$

wherein A and B are the molar fractions of the first and second acid comonomers, respectively.

6 Claims, No Drawings

HEAT-RESISTANT INJECTION-MOLDABLE COPOLYESTER RESINS AND RESIN BLENDS OF THE SAME

FIELD OF INVENTION

The present invention relates to novel copolyester resins which have excellent heat-resistant properties. More particularly, the present invention relates to highly crystalline copolyester resins which exhibit high crystallization rates thereby making them especially well suited for use in injection molding operations.

BACKGROUND AND SUMMARY OF THE INVENTION

Polyester resin are a well known class of engineering resins from which molded articles can be fabricated. For example, heat resistant polyester resins such as polycyclohexylenedimethylene terephthalate (prepared from cyclohexanedimethanol as a diol component), as well as polyethylene naphthalate and polybutylene naphthalate (which are prepared from a naphthalenedicarboxylic acid as an acid component) are well known. Furthermore, polyester resins mainly prepared from cyclohexanedimethanol and a naphthalenedicarboxylic acid are known to exhibit high glass transition temperatures and possess excellent heat resistance properties.

However, these conventional polyester resins are either non-crystalline or, if crystalline, exhibit low crystallization rates to such an extent that complete crystallization cannot be attained. Accordingly, these conventional resins are disadvantageous in that they will gradually crystallize in service under high-temperature conditions to result in reduced physical properties. As a result, these conventional polyester resins have low dimensional stability characteristics. In addition, low crystallization rates make these conventional polyester resins unsuitable for injection molding operations (i.e., due to long mold cycle times and thus decreased productivity that results).

What has been needed therefore is a polyester resin which exhibits excellent heat resistance properties as well as a high crystallization rate so as to eliminate the above-noted problems and thereby be suitable for injection molding operations. It is towards fulfilling such a need that the present invention is directed.

Broadly, the present invention provides highly crystalline and heat-resistant copolyester resins by introducing a compatible high-crystallinity component into the molecular chain of the resin by copolymerization to thereby enhance the resin's crystallization rate. In this connection, the present invention is based on the discovery that a copolyester prepared from cyclohexanedimethanol as a diol monomer component and an acid monomer component comprising both (A) a naphthalenedicarboxylic acid, and (B) 4,4'-diphenyldicarboxylic acid (as a high-crystallinity component) at a specific ratio exhibits enhanced crystallization rates as well as high heat-resistance properties.

DETAILED DESCRIPTION OF THE PREFERRED EMBODIMENTS

The present invention is embodied in heat-resistant polyester resins which are prepared by copolymerizing a diol monomer component comprising 1,4-cyclohexanedimethanol as a main constituent with an acid monomer component comprising both (A) a naphthalenedicarboxylic acid or an ester-forming derivative thereof, and (B) 4,4'-diphenyldicarboxylic acid or an ester-forming derivative thereof. The acid comonomers are, moreover, present so as to satisfy the following molar fraction ratio.

$$3/7 \leq A/B \leq 8.5/1.5$$

wherein A is the molar fraction of the naphthalenedicarboxylic acid component and B is the molar fraction of the 4,4'-diphenyldicarboxylic acid component.

The diol component which is a necessary constituent of the copolymer of the present invention is one comprised of 1,4-cyclohexanedimethanol as a main component. Although trans- and cis- isomers are known with respect to 1,4-cyclohexanedimethanol, trans-1,4-cyclohexanedimethanol and mixtures of both are all usable as the starting monomer in the present invention. The use of a trans/cis mixture is particularly preferable in respect of raw material cost.

The naphthalenedicarboxylic acid constituent is one of the necessary dicarboxylic acid monomers constituting the copolyester of the present invention and may be either a naphthalenedicarboxylic acid or an ester-forming derivative thereof (such as a dialkyl ester of naphthalenedicarboxylic acid). Although the naphthalenedicarboxylic acid component includes 2,6-naphthalenedicarboxylic acid, 2,7-naphthalenedicarboxylic acid and derivatives thereof, one comprising 2,6-naphthalenedicarboxylic acid or a derivative thereof as a main component is preferable in terms of improved heat-resistance properties and crystallization rates. It is generally advantageous in respect of raw material cost to use a mixture of 2,6-naphthalenedicarboxylic acid or a derivative thereof with other isomers such as 2,7-naphthalenedicarboxylic acid or a derivative thereof in amounts which do not affect the heat-resistance properties and/or the crystallization rates of the resulting resin.

The 4,4'-diphenyldicarboxylic acid component is the other necessary dicarboxylic acid monomer constituting the copolyester of the present invention and may be either 4,4'-diphenyldicarboxylic acid or an ester-forming derivative thereof (such as a dialkyl ester of 4,4'-diphenyldicarboxylic acid).

The copolyester resins of the present invention are especially characterized by the copolymerization reaction product of a diol component comprised of 1,4-cyclohexanedimethanol as a main constituent with a dicarboxylic acid component (which is comprised of both (A) a naphthalenedicarboxylic acid or an ester-forming derivative thereof, and (B) 4,4'-diphenyldicarboxylic acid or an ester-forming derivative thereof. As noted previously, the carboxylic acid monomer components will be present so as to satisfy the molar fraction ratio:

$$3/7 \leq A/B \leq 8.5/1.5$$

wherein A is the molar fraction of the naphthalenedicarboxylic acid monomer, and B is the molar fraction of the 4,4'-diphenyldicarboxylic acid monomer.

When the molar fraction ratio of the naphthalenedicarboxylic acid component to that of the 4,4'-diphenyldicarboxylic acid component (i.e., the A/B ratio) is less than 3/7 or greater than 8.5/1.5, the melting point of the resulting polyester will approach 300° C. As a result, the melt polymerization temperature will need to be at 300° C. or above which would cause the resin to decompose during polymerization (i.e., since the melt polymerization temperature would be too close to the decomposition temperature of the polyester).

In respect of the thermal stability and crystallinity of the polyester resin, it is particularly preferable that the carboxylic acid components be present so as to satisfy the molar fraction ratio:

$$4/6 \leqq A/B \leqq 7/3$$

It is especially advantageous in respect of raw material cost that the molar fraction of the 4,4'-diphenyldicarboxylic acid component be lower.

The copolyester of the present invention may further contain one or more known diols, dicarboxylic acids or trifunctional components incorporated into the molecular chain by copolymerization, provided that the heat-resistance properties and/or crystallization rates of the resulting resin is not significantly impaired.

The copolyester resins of the present invention can be prepared by any conventional process typically used for the preparation of polyesters. Specifically, the copolyester can be prepared by heating the monomers described above in the presence of a catalyst to conduct esterification or transesterification and polycondensing the reaction product while distilling away excess monomers and liberated components under a reduced pressure. The catalyst to be used may be a known polycondensation catalyst useful for the preparation of polyesters, specific examples of which include tetraalkoxytitaniums such as tetrabutoxytitanium; metal salts of titanium oxalate such as titanium potassium oxalate; tin compounds such as dibutyl tin oxide and dibutyl tin laurate; metal salts of acetic acid such as zinc acetate, lead acetate, manganese acetate and calcium acetate; and antimony compounds such as antimony trioxide, which may be used either alone or as a mixture of two or more of them.

In order to increase the molecular weight of the polymer (including oligomer) prepared by melt or solution polymerization, the polymer may be treated at the highest possible temperature at which fusion of polymer particles does not occur in a vacuum or inert gas atmosphere for a prescribed period of time. That is, the polymer may be subjected to so-called solid-phase polymerization. It is preferable that the polymer have an intrinsic viscosity (which is an indication of the molecular weight) of 0.3 or above, and more preferably 0.5 or above.

The polyester resin of this invention may be blended with other components so as to form a resin blend composition. In this regard, the copolyester prepared by the above-mentioned process may be melt-blended with one or more members selected from other thermoplastic resins, inorganic resins and organic additives.

Thermoplastic resins which may be used include polyolefins such as polyethylene, polypropylene, polybutadiene and polyisoprene; polyvinyl compounds such as polystyrene and polyvinyl chlorides; aromatic polyesters such as polyethylene terephthalates and polybutylene terephthalates; wholly aromatic polyester, polyamides, wholly aromatic polyamides; polycarbonates, polyphenylene sulfides, polyphenylene oxides, polyacetals and fluororesins, though the thermoplastic resin is not particularly limited. A mixture of two or more such thermoplastic resins may also be used.

The inorganic fillers may be selected from among various fibrous, powdery and flaky ones depending upon the object.

Fibrous fillers include fibers of glass, carbon, asbestos, silica, silica/alumina, alumina, zirconia, silicon nitride, boron nitride, boron and potasssium titanate; and fibers of metals such as stainless steel, aluminum, titinium, copper and brass. The powdery filler includes carbon black, graphite, silica, quartz powder, glass bead, milled glass fiber, glass balloon, glass powder, silicates such as calcium silicate, aluminum silicate, kaolin, talc, clay, diatomaceous earth and wollastonite; metal oxides such as iron oxide, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride and various powdered metals. The flaky filler incudes mica, glass flake and various metal foils. These inorganic fillers may be also used as a mixture of two or more of the same.

Examples of organic additives include stabilizers, antioxidants, ultraviolet absorbers, antistatic agents, flame retardants, auxiliary flame retardants, colorants such as dyes and pigments, slip additives for improving fluidity and mold-release properties, lubricants, crystallization accelerators and the like.

EXAMPLES

The present invention will now be described in greater detail by the following non-limiting Examples.

Example 1

A polymer having an intrinsic viscosity $[\eta]$ of 0.50 was prepared from 64.6 parts by weight of a mixture comprising trans-1,4-cyclohexanedimethanol and cis-1,4-cyclohexanedimethanol (trans/cis ratio: 7/3, hereinafter abbreviated to "CHDM-1"), 43.8 parts by weight of dimethyl 2,6-naphthalenedicarboxylate (hereinafter abbreviated to "NDA-1") and 32.3 parts by weight of dimethyl 4,4'-diphenyldicarboxylate (hereinafter abbreviated to "BB") as starting monomers through transesterification and polycondensation with 0.055 part by weight (550 ppm) of titanium tetrabutoxide (hereinafter abbreviated to "TBT") as a catalyst. The dicarboxylic acid ratio A/B of the polymer was 6/4 as determined by $^1$H-NMR spectroscopy using trifluoroacetic acid-d as a solvent. Further, the melting peak temperature of the polymer was 276° C. as determined by DSC at a temperature rise rate of 10° C./min. The difference between the crystallization peak temperature (Tc) (as determined by DSC by heat treating the polymer at a temperature drop and rise rate of 10° C./min from a molten state), and the melting peak temperature (Tm) was 60° C., which is an indication of the crystallization rate. The results are given in Table 1.

Example 2

The same procedure as that of Example 1 was repeated except that 64.1 parts by weight of CHDM-1, 36.2 parts by weight of NDA-1 and 40.1 parts by weight of BB were used as the starting monomers to obtain a polyester having an A/B ratio of 5/5. This polymer was evaluated similarly with the results given in Table 1.

Example 3

The same procedure as that of Example 1 was repeated except that 63.6 parts by weight of CHDM-1, 28.7 parts by weight of NDA-1 and 47.7 parts by weight of BB were used as the starting monomers to obtain a polyester having an A/B ratio of 4/6. This polymer was evaluated similarly with the results given in Table 1.

Example 4

The same procedure as that of Example 1 was repeated except that a 1,4-cyclohexanedimethanol isomer mixture (hereinafter abbreviated to "CHDM-2") having a trans/cis ratio of 9/1 was used instead of the CHDM-1 to obtain a polyester having an A/B ratio of 6/4. This polymer was evaluated similarly and the results are given together in Table 1.

Example 5

The same procedure as that of Example 1 was repeated except that a mixture comprising dimethyl 2,6-naphthalenedicarboxylate and dimethyl 2,7-naphthalenedicarboxylate (ratio of 2,6-isomer to 2,7-isomer: 9:1, hereinafter abbreviated to "NDA-2") was used instead of the NDA-1 to obtain a polyester having an A/B ratio of 6/4. This polymer was evaluated similarly and the results are given together in Table 1.

Example 6

The same procedure as that of Example 1 was repeated except that 65.1 parts by weight of CHDM-1, 51.5 parts by weight of NDA-1 and 24.4 parts by weight of BB were used as the starting monomers to obtain a polyester having an A/B ratio of 7/3. This polymer was evaluated similarly and the results are given together in Table 1.

Example 7

The same procedure as that of Example 1 was repeated except that 65.4 parts by weight of CHDM-1, 55.4 parts by weight of NDA-1 and 20.4 parts by weight of BB were used as the starting monomers to obtain a polyester having an A/B ratio of 7.5/2.5. This polymer was evaluated similarly and the results are given together in Table 1.

Example 8

The same procedure as that of Example 1 was repeated except that 65.6 parts by weight of CHDM-1, 59.3 parts by weight of NDA-1 and 16.4 parts by weight of BB were used as the starting monomers and that the polycondensation temperature was strictly regulated to 310° C. to obtain a polyester having an A/B ratio of 8/2. This polymer was evaluated similarly and the results are given together in Table 1.

Comparative Example 1

The preparation of a polyester having an A/B ratio of 2/8 was attempted in the same manner as that of the Example 1 except that 62.7 parts by weight of CHDM-1, 14.2 parts by weight of NDA-1 and 62.6 parts by weight of BB were used as the starting monomers. Since, however, the reaction system solidified in the course of the polycondensation subsequent to the transesterification, the reaction temperature was further enhanced. This caused the contents to become discolored, the stirring torque to rapidly dropp, and the formed polymer to decompose.

Comparative Example 2

The same procedure as that of Example 1 was repeated except that 72.3 parts by weight of CHDM-1, 40.8 parts by weight of NDA-1 and 32.4 parts by weight of dimethyl terephthalate were used as the starting monomers to obtain a polyester containing NDA-1 at a molar fraction of 0.5 based on the whole dicarboxylic acid component and having an intrinsic viscosity $[\eta]$ of 0.50. The melting peak temperature of the polymer was 272° C., but no crystallization peak was observed when the polymer was heat treated from a molten state at a temperature drop and rise rate of 10° C./min.

Comparative Example 3

The same procedure as that of Example 1 was repeated except that 25.5 parts by weight of CHDM-1, 21.9 parts by weight of ethylene glycol and 86.2 parts by weight of NDA-1 were used as the starting monomers to obtain a polyester containing CHDM-1 at a molar fraction of 0.5 based on the whole diol component and having an intrinsic viscosity $[\eta]$ of 0.50. The melting peak temperature of the polymer was 274° C., but no crystallization peak was observed when the polymer was heat treated from a molten state at a temperature drop and rise rate of 10° C./min.

TABLE 1

| | Example | | | | | | | |
|---|---|---|---|---|---|---|---|---|
| | 1 | 2 | 3 | 4 | 5 | 6 | 7 | 8 |
| CHDM-1 (pt. wt.) | 64.6 | 64.1 | 63.6 | — | 64.6 | 65.1 | 65.4 | 65.6 |
| CHDM-2 (pt. wt.) | — | — | — | 64.6 | — | — | — | — |
| NDA-1 (pt. wt.) | 43.8 | 36.2 | 28.7 | 43.8 | — | 51.5 | 55.4 | 59.3 |
| NDA-2 (pt. wt.) | — | — | — | — | 43.8 | — | — | — |
| BB (pt. wt.) | 32.3 | 32.3 | 40.1 | 47.7 | 32.3 | 24.4 | 20.4 | 16.4 |
| TBT (pt. wt.) | 0.055 | 0.055 | 0.055 | 0.055 | 0.055 | 0.055 | 0.055 | 0.055 |
| A/B | 6/4 | 5/5 | 4/6 | 6/4 | 6/4 | 7/3 | 7.5/2.5 | 8/2 |
| $[\eta]$ | 0.50 | 0.70 | 0.65 | 0.55 | 0.55 | 0.55 | 0.55 | 0.50 |
| melting peak temp. (°C.) | 276 | 272 | 279 | 282 | 272 | 288 | 295 | 305 |
| (Tm − Tc) (°C.) | 60 | 50 | 54 | 57 | 60 | 61 | 66 | 68 |

As will be understood from the above description and Examples, the copolyester resins of the present invention exhibit excellent heat-resistance properties and enhanced crystallization rates. As a result, the resins of this invention can be molded in shorter cycle times thereby improving productivity. By virtue of these characteristics, the copolyester resins and compositions which include the same are processable (e.g., by injection or extrusion molding) into films, sheets, fibers, and so forth. The resins are particularly suitable for use in applications where heat-resistance is needed including electronic and electric appliances, automotive and aeronautical components, and the like. The benefits of the copolyester resins of this invention are particularly realized when the resins are formed into useful articles by injection molding.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heat-resistant moldable copolyester resin which is the copolymerization reaction product of:
   a diol monomer component consisting essentially of 1,4-cyclohexanedimethanol; and
   an acid monomer component which includes (i) a first acid comonomer consisting essentially of napthalenedicarboxylic acid or the dimethyl derivative thereof, and (ii) a second acid comonomer consisting essentially of 4,4'-diphenyldicarboxylic acid or an ester-forming derivative thereof, and wherein said first and second comonomers are present in amounts which satisfy a molar fraction ratio:

$$3/7 \leq A/B \leq 8.5/1.5$$

wherein A and B are the molar fractions of the first and second acid comonomers, respectively.

2. A heat-resistant moldable copolyester as in claim 1, wherein said first and second acid comonomers are present in amounts to satisfy the molar fraction ratio:

$$4/6 \leq A/B \leq 7/3.$$

3. A heat-resistant copolyester resin as in claim 1, wherein said first acid comonomer consists essentially of 2,6-napthalenedicarboxylic acid.

4. A moldable polyester resin composition comprising a blend of the heat-resistant copolyester resin as in claim 1, 2 or 3, and at least one additive selected from thermoplastic resins, inorganic fillers and organic additives.

5. A method of making a heat-resistant moldable copolyester resin comprising copolymerizing:
   a diol monomer component consisting essentially of 1,4-cyclohexanedimethanol; and
   an acid monomer component which includes (i) a first acid comonomer consisting essentially of napthalenedicarboxylic acid or the dimethyl derivative thereof, and (ii) a second acid comonomer consisting essentially of 4,4'-diphenyldicarboxylic acid or an ester-forming derivative thereof, and wherein said first and second comonomers are present in amounts which satisfy a molar fraction ratio:

$$3/7 \leq A/B \leq 8.5/1.5$$

wherein A and B are the molar fractions of the first and second acid comonomers, respectively.

6. A method as in claim 5, wherein said first and second acid comonomers are present in amounts to satisfy the molar fraction ratio:

$$4/6 \leq A/B \leq 7/3.$$

* * * * *